No. 702,743. Patented June 17, 1902.
J. C. PRATT.
BICYCLE CONSTRUCTION.
(Application filed May 7, 1901.)
(No Model.) 3 Sheets—Sheet 1.
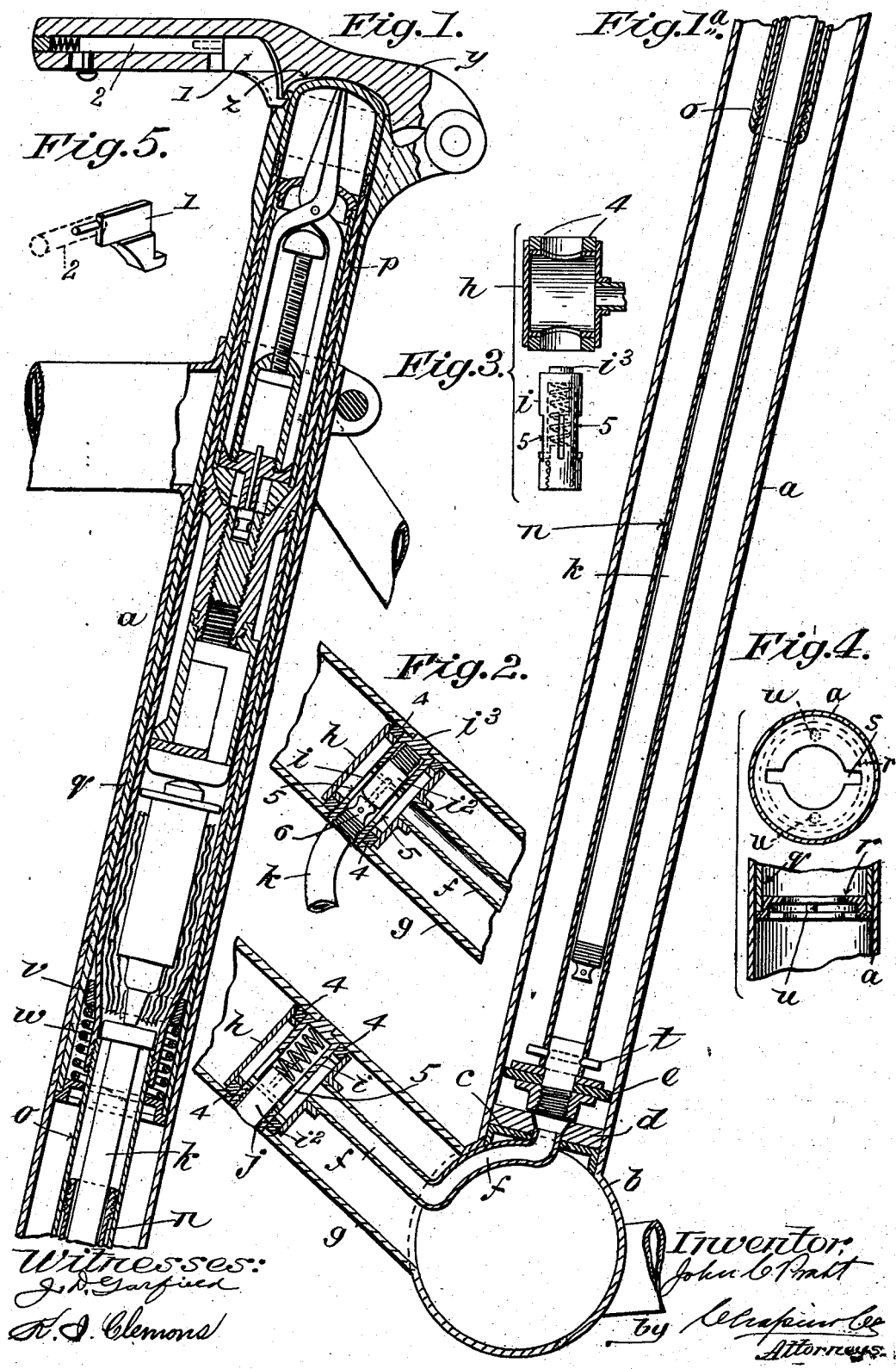

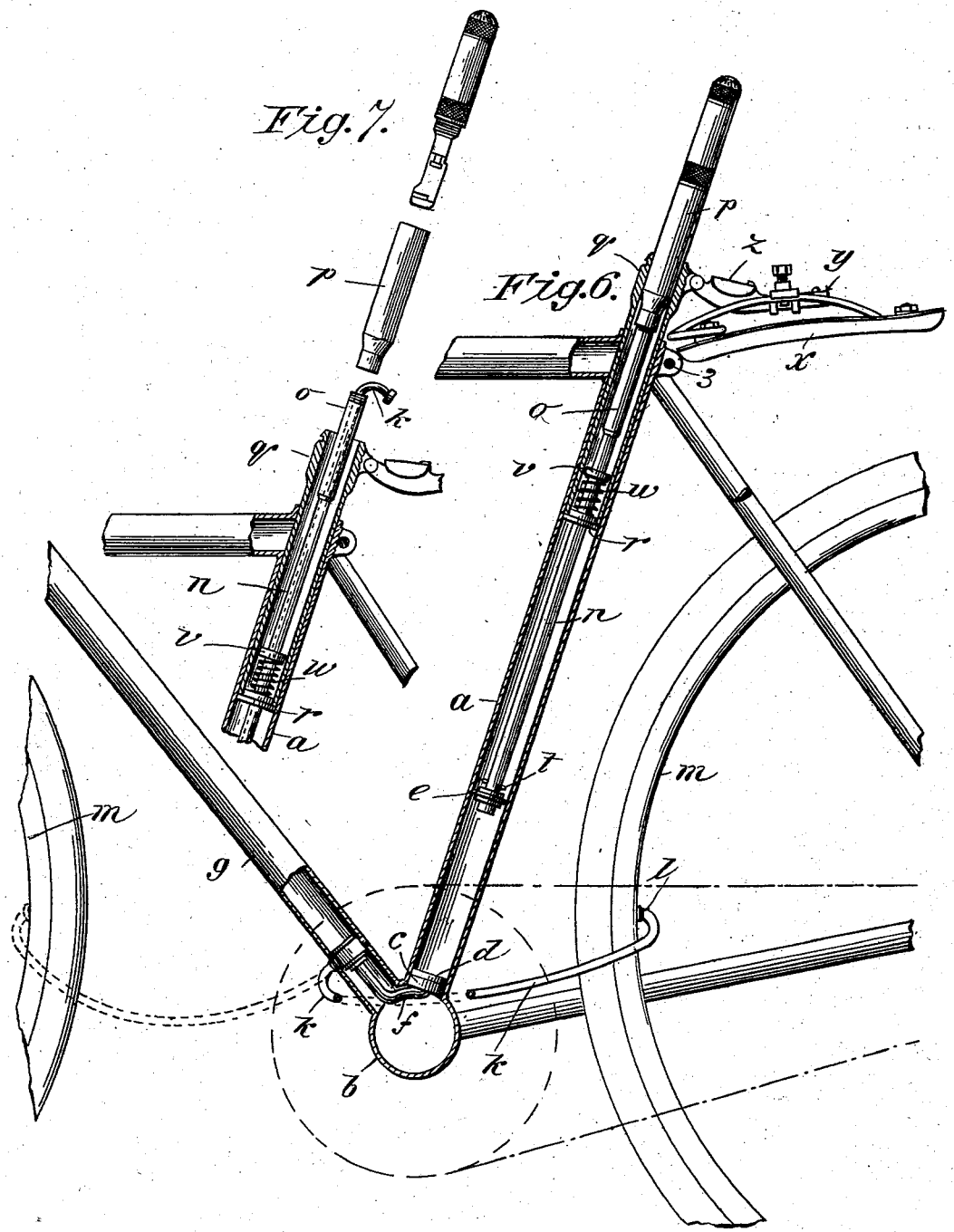

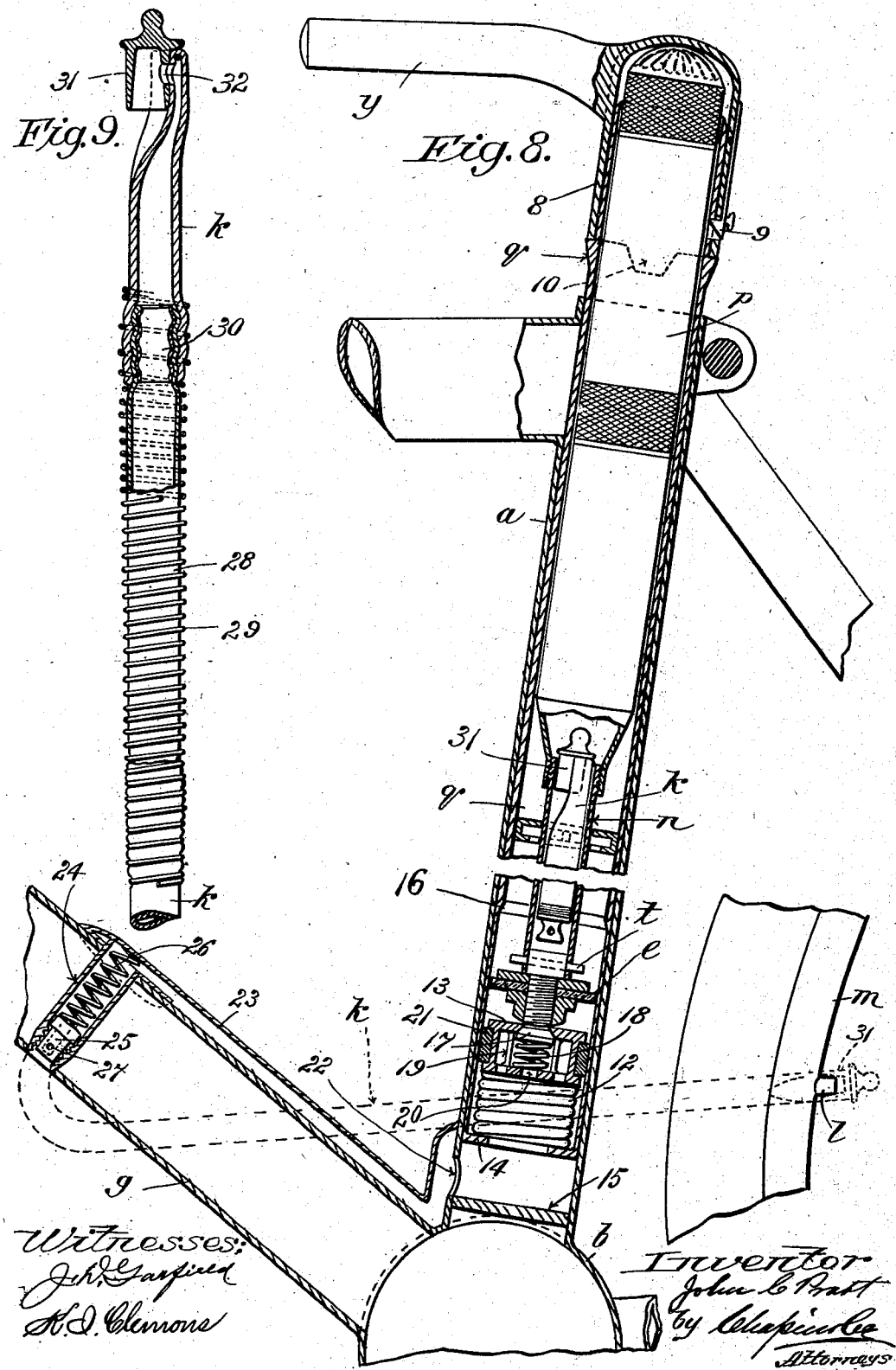

UNITED STATES PATENT OFFICE.

JOHN C. PRATT, OF HARTFORD, CONNECTICUT, ASSIGNOR OF ONE-HALF TO ARTHUR L. FOSTER, OF HARTFORD, CONNECTICUT.

BICYCLE CONSTRUCTION.

SPECIFICATION forming part of Letters Patent No. 702,743, dated June 17, 1902.

Application filed May 7, 1901. Serial No. 59,097. (No model.)

*To all whom it may concern:*

Be it known that I, JOHN C. PRATT, a citizen of the United States of America, residing at Hartford, in the county of Hartford and State of Connecticut, have invented new and useful Improvements in Bicycle Constructions, of which the following is a specification.

This invention relates to bicycles; and the object thereof is to provide an improved construction of pump for inflating the tires, a part of the frame of the machine constituting the body of the pump, a further object of the invention being to so construct the pump parts as to adapt them to be stowed away in that part of the frame which constitutes the body of the pump and to provide means for holding them in said frame part when the bicycle is in use, a still further object being to construct certain of the pump parts to receive tools necessary to the bicycle.

The invention consists in the construction described in the following specification and clearly pointed out in the claims.

In the drawings forming part of this specification, Figures 1 and 1$^a$ represent a part of the frame of a bicycle to which my invention is applied, Fig. 1 representing the upper part of the frame and Fig. 1$^a$ the lower part. Fig. 2 is a detached view of a part of Fig. 1$^a$, showing the parts in another position. Fig. 3 is a detached view of the parts shown in Fig. 2 in their separated relations. Fig. 4 is a plan view and sectional elevation of fixed annular partitions in the frame. Fig. 5 is a perspective view of a latch on the saddle-bar of the seat-post. Fig. 6 is a side elevation of a part of a bicycle on a somewhat-smaller scale, partly in section, showing the parts in a different position to that shown in Figs. 1 and 1$^a$. Fig. 7 is a sectional elevation of a part of the frame shown in Fig. 6, showing some of the parts separated from the others. Fig. 8 is a sectional elevation of a modified construction of the pump. Fig. 9 is a side elevation, partly in section, of a modified construction of the connecting-tube extending from the pump to the wheel-tires.

In carrying out my invention the seat-post brace $a$ of the frame of the bicycle constitutes the body of the pump. The lower end of this brace when it is joined to the crank-hanger $b$ is closed by a cup-shaped piece $c$, secured therein in any suitable manner, which serves as a support for a rubber buffer $d$, against which the end of the plunger or piston $e$ of the pump may strike without injury to the latter during the operation of the pump. Said cup-shaped piece $c$ is provided with an aperture through it in which is secured the end of a tube $f$, which extends down through the crank-hanger, as shown in Figs. 1$^a$ and 6, and up into the end of the front diagonal brace, (indicated by $g$.) The buffer $d$ is provided with an aperture registering with that of the cup-shaped piece $c$. At a point near the crank-hanger $b$ the tube $f$ enters and is secured to a cylindrical case $h$, (shown in Figs. 1$^a$, 2, and 3,) within which is located a tubular casing $i$, in which is a spring-actuated plunger $i^2$, adapted to close the hole $j$ in the brace $g$, through which connection is made with the said case $h$ by the usual flexible tube $k$, which leads to the valve $l$ in the wheel-rim $m$, which valve is of the usual construction. This tube is shown in Fig. 6 in full lines leading to the rear wheel and in dotted lines showing it leading over to the front wheel.

The rod of the pump-piston $e$ is composed of three parts, viz: First, that part to which the piston-head is attached, (indicated by $n$;) second, that part which fits over the upper end thereof telescopically, (indicated by $o$,) and, third, the handle part, which screws into the end of the part $o$, which is indicated by $p$, and all of these parts fit inside of the seat-post brace $a$. The seat-post $q$ is located in the upper end of this brace, as usual, and is adjustable vertically therein in the usual manner, the handle part $p$, above referred to, fitting inside the seat-post and being endwise movable therein. On the lower end of the seat-post is fixed the ring $r$, (shown in detail in Fig. 4,) which serves as a guide for the parts $n$ and $o$ of the piston and constitutes a sort of movable partition in the seat-post brace $a$. Said ring $r$ is chambered out, as shown in said Fig. 4, the lower side thereof being provided with slotted portions $s$ to permit the entrance into said chambered-out portion of the pin $t$, fixed transversely in the rod near the piston-head $e$. Across said chambered part of the ring $r$ are two pins $u$, with which the said pin $t$ engages. The object of this construction is this: The parts $n$ and $o$ of the piston-rod are arranged telescopically to permit one to be moved down over the other for the inclosure thereof with the handle portion $p$ entirely within the seat-post $q$ and the seat-post brace $a$. In order to operate the pump, however, these parts $o$ and $n$ must be united, and to effect this union the handle part $p$ is grasped and drawn outwardly until the internally-threaded end of the part $o$ comes up into position of engagement with the externally-threaded end of the handle part $p$. The rod is then rotated until the pin $t$ enters, through the slots $s$, the chambered portion of the ring $r$. If now the handle portion be turned, the part $n$ of the rod will be held against rotation, and the section $o$ of the rod may be screwed onto it, which provides a stiff rod for pumping purposes. When the sections $o$ and $n$ are unscrewed to be nested in the seat-post $q$ and the brace $a$ and are pushed down inside of the latter, the tapered portion at the lower end of the handle-piece $p$ fits snugly in a ring $r$, vertically movable within the seat-post, which is secured to the top of a coiled spring $w$, secured to the top of the ring $r$, and when the end of the handle part $p$ is substantially flush with the top of the seat-post this spring $w$ will be in a compressed condition, as shown in Fig. 1. The object of this spring is to force the handle part $p$ far enough out of the seat-post $q$ to enable it to be grasped by the hand when said handle $p$ is released by the throwing over of the seat $x$, as shown in Fig. 6. This spring serves the further purpose of preventing the rattling of the handle-piece.

On the top of the saddle-post, at the rear side thereof, is hinged the saddle-bar $y$. In Fig. 1 this is shown in operative position and is provided with a cup-shaped cavity $z$, which fits over the top of the handle part $p$, the top of the saddle-post itself being tapered to correspond with the tapered sides of this cavity, to the end that when the bar is in the position shown in Fig. 1 and is secured to the top of the post by the spring-latch 1 there will be no rattling of the parts. This spring-latch may be of any convenient form. As shown herein, the saddle-bar $y$ is made tubular and is provided with a slotted portion next to the seat-post, in which is a sliding latch, (shown in Fig. 5,) a stem 2 serving to impart movements to the latch in one direction by means of a spiral spring acting between the outer end of the bar and the end of said stem. Any other form of latch would answer every purpose, however, which would securely hold the saddle-bar in horizontal position. The seat $x$ may be attached to this bar in the usual manner for adjustment in a horizontal plane, and the seat-post may be adjusted vertically in the saddle-post brace $a$ in the usual manner by means of the clamping-bolt 3, the location of the pump in this part of the frame not interfering in the slightest degree with this saddle adjustment. The flexible tube $k$, by which connection is made from the pump to the tires, is carried within the parts $o$ and $n$ of the pump-piston, all as shown in Figs. 1, 1$^a$, and 7.

There is no particular reason for locating the point of connection for the tube $k$ with the pump in the brace $g$ at the point shown in the drawings, except that the point is chosen as being substantially equidistant from the rims of the front and rear wheels, and therefore permits the use of a tube $k$ of the shortest dimension, which would serve for both tires, and this length can readily be inserted and carried in the tubular members $o$ and $n$ in the pump-piston.

I prefer to use the tubular handle-bar piece $p$ as a boxing for certain tools, such as are in constant demand by the users of bicycles, whereby the carrying of a tool-bag on the frame or in the pocket is entirely obviated. These tools are so nested together, as shown in Fig. 1, and secured in fixed position in the handle-piece $p$ by means of the screw-cap forming part of the latter that they are prevented from rattling by the movement of the machine when in use. The construction of this tool-holder, however, and the particular grouping of the tools shown therein in Fig. 1 do not constitute a part of this invention, but are reserved for another application, and in the pump-handle $p$ shown herein the tools may be arranged and grouped together in any manner desired.

A closure for the opening $j$ in the brace $g$ is provided by the spring-actuated plunger $i^2$, which retires within the casing $i$ as the end of the tube $k$ is screwed into the opening $j$. The cylindrical casing $i$ is practically inclosed in a chamber consisting of the case $h$, the two end walls of which are practically sealed by two packing-rings 4. (Shown in Fig. 3.) The tubular casing $i$ has two oppositely-located slots 5, through which air may pass from the case $h$ into said casing, and the end of the nipple of the tube $k$, which screws into the opening $j$ and forces the plunger $i^2$ inward, has no opening through the end thereof that bears on said plunger; but said nipple below its end is provided with an annular groove which when the nipple is in position will lie opposite a part of the slots 5, and air passing through said slots may enter the tube $k$ through an aperture 6, located in the annular groove in said nipple. When the latter is unscrewed, the plunger $i^2$ follows and closes the opening $j$, thus excluding all dirt from the frame. A slight projection $i^3$ is provided on the top of the tubular casing $i$, which projects through a small hole in the frame opposite the hole $j$. This serves to steady the case $h$ in its position in the brace $g$.

In operating this invention (assuming the parts to be in the position shown in Fig. 1) if it is desired to pump up a tire the latch 1 is withdrawn, the force of the spring $w$ partially raising the saddle, which is thrown over to the position shown in Fig. 6. The handle part *p* is then grasped and drawn outwardly as far as it will come and turned in the direction necessary to screw the parts *o* and *n* together, the part *n* being held against rotation by the engagement with the partition *r*, as described. When secured to the part *n*, the part *o* will project beyond the end of the seat-post, and it is then grasped by the hand and the handle part *p* unscrewed therefrom, whereby access may be had to the flexible tube *k*, which is withdrawn and the handle part again screwed onto the part *o*. The tube is now secured to the valve on one of the wheels by one end, and its opposite end is screwed into the cylindrical casing *i* in the brace *g*, the spring-plunger *i²* retiring as the nipple on the end of the tube *k* is screwed inward. The pump is now ready for operation, and without detaching the tube *k* from the pump the opposite end thereof may be connected with either wheel.

Figs. 8 and 9 show certain modifications of the hereinbefore-described constructions, which fall legitimately within the scope of the invention. In Fig. 8 instead of making the saddle-bar *y* to swing over and down on the top of the brace *a* to hold the pump parts in their proper position therein the saddle-bar in this modification is provided with a socketed end 8, which fits down over the end of the brace *a*, and it is provided with a spring-latch 9 or some similar fastening device for securing it to the post *q*. On opposite sides of the lower edge of the socket 8 are two projections 10, one of which is shown in dotted lines in Fig. 8, which fit into similarly-shaped notches on the brace *a*, whereby the saddle-bar is maintained in line with the frame.

Another modification consists in extending the saddle-post *q* nearly to the bottom of the brace *a* and in doing away with the telescoping member *o* of the pump-rod and making the part *n* long enough to screw into the end of the handle-piece *p*. This necessitates the withdrawal of the plunger or piston *e* in operating the pump to a greater extent than in the hereinbefore-described construction, and would leave so great a distance between the piston and the bottom of the pump-body as to interfere with the proper operation of the pump, and therefore this space is occupied in this construction by the spring 12, which takes the place of the spring *w* (shown in Figs. 1, 6, and 7) and a cylindrical head 13, secured to the upper end of said spring, the lower end of the saddle-post having an inturned flange 14 on it to give a seat to the lower end of the spring. The lower end of the brace *a* is tightly sealed by a disk 15. When the saddle-post is adjusted vertically, the entire pump mechanism moves with it. When the pump parts are pushed into the saddle-post, the spring 12 is compressed, as shown in said Fig. 8, by the bearing of the piston on the cylindrical head 13, and when the saddle-bar, which holds these parts in the post, is removed the expansion of the spring moves the parts upwardly in the seat-post *q* until the edge of the head 13 strikes the shoulder 16 in said post, which is formed by turning out the end of the latter to a slightly-larger diameter. Instead of turning a flange, as 14, inward to form a seat for the spring 12, the end of said post may be closed by securing a ring therein in any desired way. In the head 13 is a check-valve 17, held on its seat by the spring 18, and surrounding said valve are suitable posts 19, which serve as a cage for the valve to keep it in proper position relative to its seat. The lower end of the head 13 is pierced with holes 20 to permit the passage of air therethrough. I introduce a packing 21 between the head and the wall of the seat-post *q*, whereby air is prevented from entering the pump-body above this point on the upstroke of the pump. At a point between the lower end of the seat-post *q* and the disk 15 an opening 22 is made through the wall of the seat-post brace *a*, from which air forced therethrough by the action of the pump is carried in a conduit 23 to a point on the brace *g*, from which connection by means of the tube *k* may be made with the tires of the wheels. This conduit is constructed by brazing to the frame a trough-like piece bent to conform to the frame parts, covering at one end said opening 22 and at the opposite end the open end of a short tube 24, extending transversely through the brace *g*. This tube is necked down at the end thereof which passes out at the lower side of the brace *g* and is internally screw-threaded to receive the threaded nipple in one end of the tube *k*. The threading of this tube provides a convenient shoulder for the head of the plunger 25 therein to abut against. This plunger is for the same purpose as the plunger *i²* in the frame part *i*, heretofore described, and is normally held in the position shown in Fig. 8 by means of the spring 26. The head of the plunger fits the bore of the tube 24, and to permit the passage of air through the plunger it is bored out axially from the top nearly to the bottom and a transverse hole 27 is then made through it, intercepting the axial hole. When the plunger is raised by the introduction of the nipple on the connecting-tube *k*, said transverse hole 27 is raised out of the threaded portion of the tube 24, and the passage of air through the plunger 25 will therefore be unobstructed, the construction of the nipple being the same as heretofore described. In this modified construction the tube *k* connecting the pump with the wheel-tires is carried in the tubular part *n*, as in the construction shown in the preceding figures. The tube shown in detail and on a somewhat-enlarged scale in Fig. 9 has certain peculiarities of construction, however. The extremities of the tube are of the ordinary type of rubber tubing commonly used for the purpose, and between these extremities is introduced an extensible section of tubing 28, which is wound with wire 29 in the form of a coil, which also constitutes a spring which aids in the retraction of the tube when it has been extended. This tube-section 28 is secured in its place by the ends of the wire 29 binding it tightly between a metal bushing 30 in the end of one of the extremities of the tube, as shown in section in Fig. 9. The winding of this extensible section 28 of the tube with wire serves also to stiffen it, whereby one is enabled to more easily insert it in the tubular member $n$. The purpose of making the tube $k$ extensible is to adapt it to be used with a cap 31, such as is shown in said Fig. 9, and adapted to be held onto the valve in the wheel-rim by the tension of the elastic portion of the tube $k$. The interior of the cap is cylindrically tapering to adapt it to fit valves of slightly-varying diameters. The tube on the end of which this cap is fitted must be closed at that end and the cap cemented to the outside of the tube, as shown, an air-passage 32 being made through the wall of the cap and that wall of the tube which is cemented to the cap, all as clearly shown in Fig. 9. This construction permits the tube $k$ to be screwed into the opening $j$ in the brace $g$ of the frame, and the tube then stretched sufficiently to hook the cap 31 over the valve in the wheel-rim.

By means of the herein-described construction a very powerful pump is provided, which is always with the machine, ever ready and immediately accessible, and which obviates the necessity of carrying along, strapped to the outside of the machine, a pump of the usual type, and by utilizing the handle part of the pump as a tool-holder everything that one may need on a bicycle tour is provided and carried out of sight.

Having thus described my invention, what I claim, and desire to secure by Letters Patent of the United States, is—

1. The combination with the frame member of a bicycle in which the saddle-post is secured, of a pump of which said frame member constitutes the body, a piston-rod in the pump, the outer end of which normally projects beyond the upper end of the frame member, means to depress and lock the rod within the said frame member and means to eject the said rod when it is released.

2. The combination with the frame member of a bicycle in which the saddle-post is secured, of a pump of which said frame member constitutes the body, a piston-rod in the pump the outer end of which projects beyond the upper end of the frame member, a saddle-bar pivotally supported on the said post and unattached to the pump-rod and adapted to be swung over the said rod to depress and hold it within the pump and means to eject the rod when the seat is swung out of engagement therewith.

3. The combination with the frame member of a bicycle, of a pump of which said frame member constitutes the body, of a pump therein, a pump-rod comprising telescopic sections, suitable screw-threads on said sections, a partition in said pump-body through which said rod passes, lugs on the partition, and lugs on one of the pump-rod sections to engage the lugs on the partition, whereby one of said sections may be held against rotation and the sections screwed together.

4. The combination with a frame of a bicycle, one of whose members constitutes a pump-body, of a pump therein, a pump-rod comprising telescoping sections, suitable screw-threads on said parts, radial projections on one of the sections, a partition through which the pump-rod passes, said partition comprising upper and lower plates spaced apart to provide a chamber, pins in the chamber and radial slots in the lower plate to permit the pins on the pump-rod to enter the chamber and be lodged against the pins therein, whereby the said rod is held against rotation and the parts may be screwed together.

5. The combination with a frame member of a bicycle, in which the saddle-post is secured, of a pump of which said frame member constitutes the body, a fixed transverse partition in said frame member, a pump-rod extending through said partition and consisting of several sections adapted to be contained in said member, a spring on said partition for engaging with said rod, whereby the latter may be forced into said member against said spring, and the rattling of the parts be thereby prevented, and means for locking said sections temporarily in said member, substantially as described.

JOHN C. PRATT.

Witnesses:
H. A. CHAPIN,
J. D. GARFIELD.